United States Patent
Hazucha et al.

(10) Patent No.: US 7,224,203 B2
(45) Date of Patent: May 29, 2007

(54) ANALOG VOLTAGE DISTRIBUTION ON A DIE USING SWITCHED CAPACITORS

(75) Inventors: Peter Hazucha, Beaverton, OR (US); Tanay Karnik, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 14 days.

(21) Appl. No.: 10/686,962

(22) Filed: Oct. 15, 2003

(65) Prior Publication Data

US 2005/0083106 A1 Apr. 21, 2005

(51) Int. Cl.
*G06F 7/64* (2006.01)
(52) U.S. Cl. .................................... 327/337
(58) Field of Classification Search ................ 327/94, 327/239, 242, 258–259, 277–278, 295–296, 327/337, 537, 543
See application file for complete search history.

(56) References Cited

U.S. PATENT DOCUMENTS

| | | | |
|---|---|---|---|
| 5,859,632 A * | 1/1999 | Ito | 345/211 |
| 5,894,284 A * | 4/1999 | Garrity et al. | 341/172 |
| 5,905,404 A * | 5/1999 | Nagaraj | 327/589 |
| 6,144,232 A * | 11/2000 | Yukawa et al. | 327/77 |
| 6,456,123 B1 * | 9/2002 | Oakeson et al. | 327/91 |
| 6,559,492 B1 * | 5/2003 | Hazucha et al. | 257/299 |
| 6,559,689 B1 * | 5/2003 | Clark | 327/97 |
| 6,621,445 B1 * | 9/2003 | Thilenius | 341/172 |
| 6,977,542 B2 * | 12/2005 | Ganeshan et al. | 327/553 |

* cited by examiner

*Primary Examiner*—My-Trang Nu Ton
(74) *Attorney, Agent, or Firm*—Murthy S.K.

(57) ABSTRACT

In an embodiment, a switched capacitor transformer transfers a differential reference voltage at its input ports to its output ports, where a capacitor is switched so that the capacitor is coupled to the input ports during a first portion of a cycle of operation and then coupled to the output ports during a second portion of the cycle of operation, where the first and second portions of the cycle of operation are non-overlapping. Other embodiments are described and claimed.

20 Claims, 7 Drawing Sheets

US 7,224,203 B2

ANALOG VOLTAGE DISTRIBUTION ON A DIE USING SWITCHED CAPACITORS

FIELD

The invention relates to analog circuits, and more particularly, to switched capacitor circuits.

BACKGROUND

Integrated circuits often contain analog functional unit blocks (FUB) that require one or more reference voltages. For example, in FIG. 1, die 102 comprises a microprocessor with many sub-blocks, such as, for example, phase-locked loop 116, voltage regulator 118, and interconnect driver 120. Some of these FUBs allow die 102 to communicate with other integrated circuits, such as off-die cache 104 and higher memory hierarchy levels, such as system memory 108 accessed via host bus 110 and chipset 112. The reference voltages provided to these various FUBs are often used to set some circuit property, such as, for example, amplifier bias, PLL frequency, or the output voltage of a voltage regulator. The reference voltage should be stable with respect to low and high frequency noise coupled through the semiconductor substrate of die 102, interconnects, or power supply 114. Otherwise, the performance of various FUBs may be degraded. For example, the output voltage of a voltage regulator may fluctuate if the reference voltage is not stable.

Bandgap circuits have been used to generate local reference voltages. However, a bandgap circuit makes use of an amplifier, which may add an offset as well as high frequency power supply noise to the reference voltage. Bandgap circuits at different locations on a die may not provide identical reference voltages due to variations in offset and noise power. A single bandgap circuit may be used to distribute a reference voltage as a single ended signal to different locations on a die. However, a single ended signal is not tolerant to noise coupled through a power supply or the substrate, for example. As a result, differential signaling is often preferred to single-ended signaling. A receiving FUB may utilize a received differential signal directly, or translate the differential voltage into a single-ended voltage referenced to a local ground or local $V_{CC}$.

Ideally, common-mode noise in a differential signal may be cancelled by forming the difference of the differential signal to arrive at a single-ended signal. An example of a differencing (or subtracting) circuit is shown in FIG. 2. A differential signal is provided at input ports 202 and 204. Resistors 206 are designed to have the same resistance, and the voltage at output port 208 is referenced to ground 210 and is ideally the difference of the voltages at input ports 202 and 204. Common-mode noise at input ports 202 and 204 is ideally subtracted out. However, in practice there is a matching error in resistors 206, and their resistance (for well resistors, for example) may be temperature and voltage dependent. Furthermore, there may be an offset and high frequency noise coupling due to amplifier 212. A low-pass RC filter may be used to filter out high frequency power noise, but due to large MOS gate leakage in present day process technology, it has become difficult to implement an area efficient RC filter with a time constant larger than about 1 nanosecond. There is consequently a need for a noise tolerant voltage distribution technique for present day process technology.

BRIEF DESCRIPTION OF THE DRAWINGS

FIG. 5b depicts a cycle of operation for the clock generator of FIG. 5a.

DESCRIPTION OF EMBODIMENTS

Figure 1:
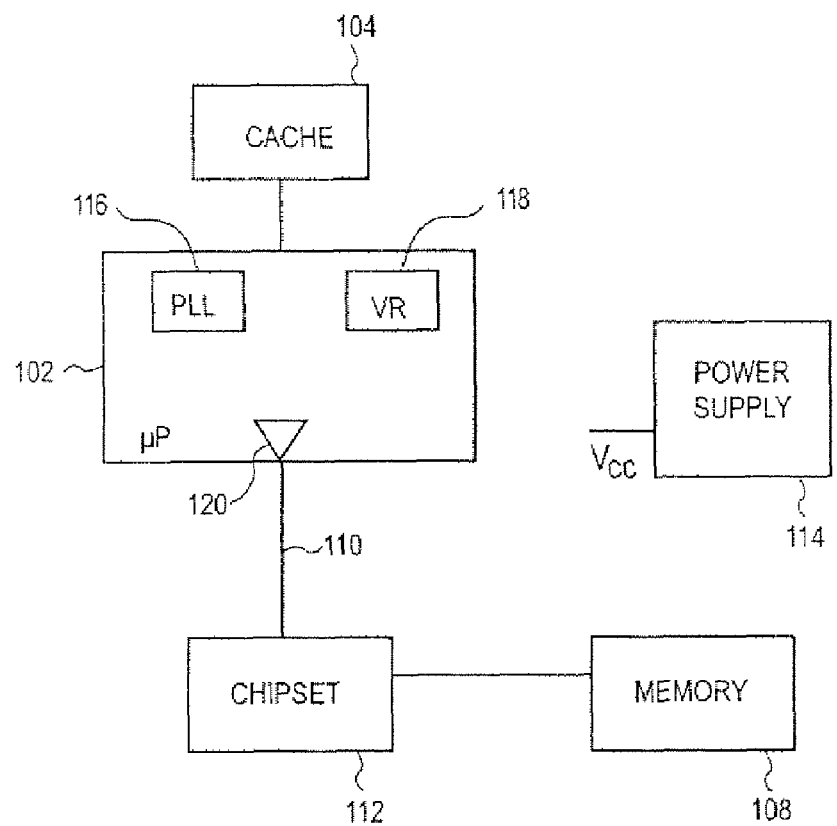
FIG. 1 depicts a portion of a prior art computer system.
Figure 2:
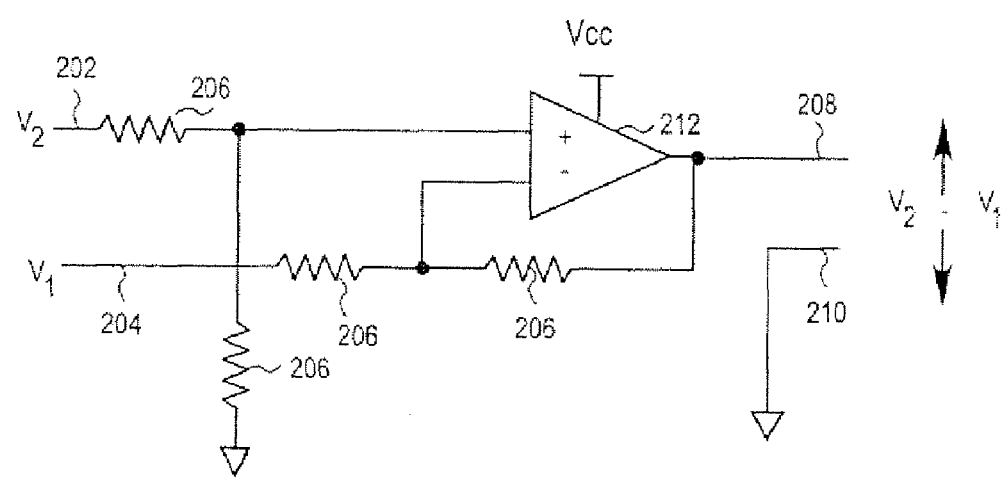
FIG. 2 depicts a prior art circuit for providing the difference of an input differential voltage signal.
Figure 3:
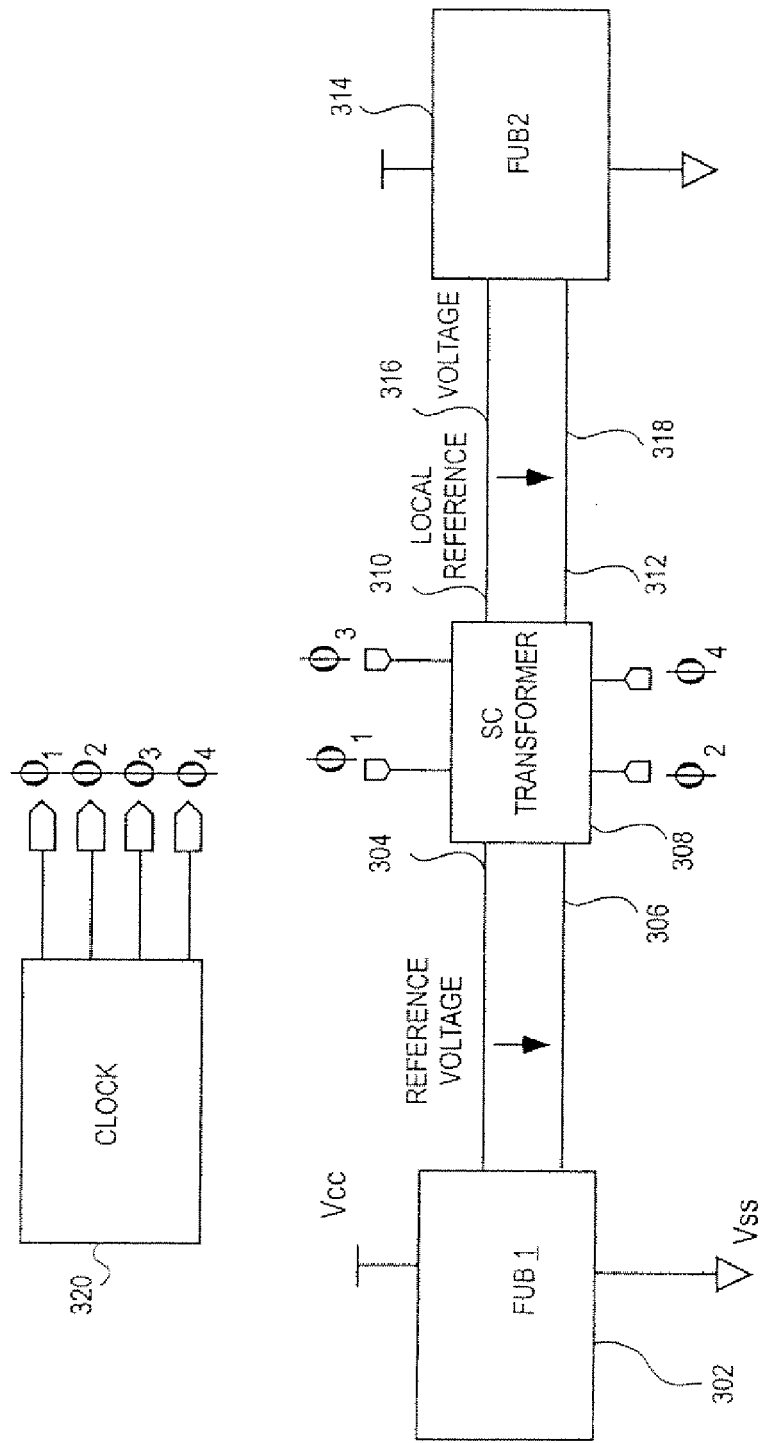
FIG. 3 depicts an embodiment of the present invention.

FIG. 3 is a high-level depiction of a system employing an embodiment of the present invention. FUB1 302 is a functional unit block generating a reference voltage. This reference voltage is provided at input ports 304 and 306 of switched capacitor transformer 308. Switched capacitor transformer 308 provides a local reference voltage at output ports 310 and 312. This local reference voltage is utilized by other functional unit blocks, such as FUB2 314, connected to switched capacitor transformer 308 via interconnects 316 and 318. The embodiment of switched capacitor transformer 308 in FIG. 3 makes use of four clock signals, $\phi_i$, i= 1, . . . , 4, generated by clock unit 320.

Differential signaling is employed, where the reference voltage at input ports 304 and 306 is the voltage potential difference between input ports 304 and 306, and the local reference voltage at output ports 310 and 312 is the voltage potential difference between output ports 310 and 312. With proper signal routing, noise coupled by interconnects 316 and 318 (or the substrate, not shown) appears as common mode noise and should marginally affect the differential signal (voltage potential difference) on interconnects 316 and 318. One of the interconnects may be connected to the local ground of FUB2 314, but this is not a requirement.

Figure 4:
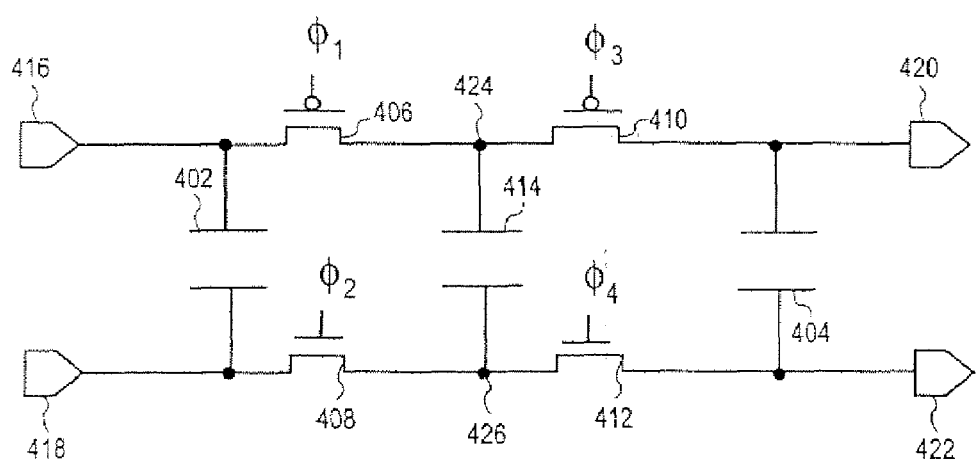
FIG. 4 depicts a circuit for the switched capacitor transformer in the embodiment of FIG. 3.

An embodiment of switched capacitor transformer 308 at the circuit-level is provided in FIG. 4. In some embodiments, capacitors 402 and 404 may not be present. The transistors in FIG. 4 are switched so that there is a first portion of a cycle of operation for which transistors 406 and 408 are both ON to couple capacitor 414 to input ports 416 and 418, and transistors 410 and 412 are both OFF to isolate capacitor 414 from output ports 420 and 422; and there is a second portion of a cycle of operation for which transistors 410 and 412 are both ON to couple capacitor 414 to output ports 420 and 422, and transistors 4106 and 408 are both OFF to isolate capacitor 414 from input ports 416 and 418. This switching is such that transistors 406 and 410 are not both ON, and transistors 408 and 412 are not both ON.

During the first portion of a cycle of operation, capacitor 414 develops a potential difference equal to (or more precisely, approximately equal to) the potential difference of input ports 416 and 418, and during the second portion of a cycle of operation capacitor 414 "transfers" this potential difference to output ports 420 and 422. In this way, the switched capacitor transformer mitigates low and high frequency power supply noise coupling by acting as a "floating power supply", which may, for example, be referenced to a local ground at the receiving end (FUB2 314).

Figure 5B:
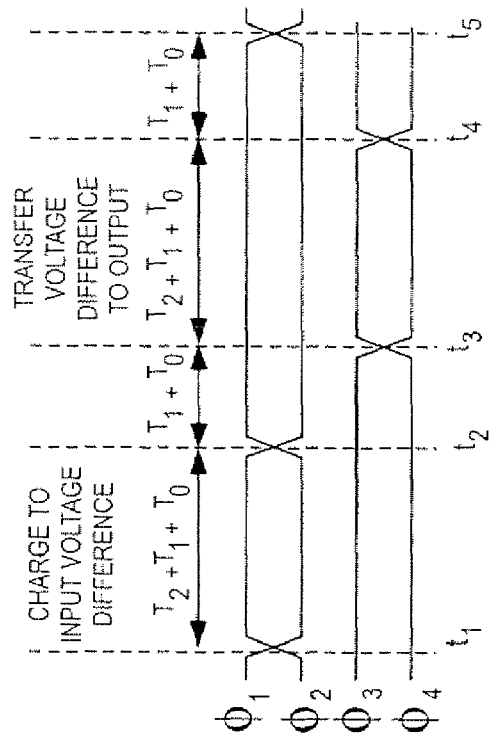
Figure 5A:
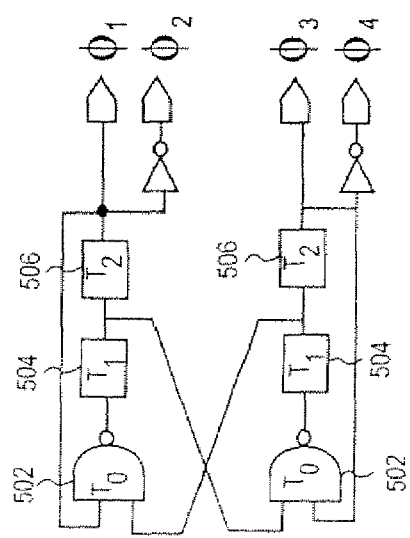
FIG. 5a depicts a circuit for the clock generator in the embodiment of FIG. 3.

A circuit for generating the clock signals is provided in FIG. 5a, with a timing diagram of the generated clock signals shown in FIG. 5b. In FIG. 5a, the delay of NAND gates 502 is denoted as $T_0$, the delay of delay elements 504 is denoted as $T_1$, and the delay of delay elements 506 is denoted as $T_2$. Delay elements 502 and 504 are non-inverting delay elements, and may be implemented by cascading an even number of CMOS inverters. Inspection of the circuit in FIG. 5a yields the clock signals for one cycle (period) are indicated in FIG. 5b, where the clock signals are seen to be periodic with period substantially equal to $4T_0 + 4T_1 + 2T_2$. The portion of the cycle for which both transistors 406 and 408 are ON is the time interval $[t_1, t_2]$ indicated on the time axis of FIG. 5b, and the portion of the cycle for which both transistors 410 and 412 are ON is the time interval $[t_3, t_4]$ indicated on the time axis. These time intervals have the same time duration, indicated as $T_2 + T_1 + T_0$ in FIG. 5b. Note that there are two portions of the cycle for which all the transistors are OFF, which are the time intervals $[t_2, t_3]$ and $[t_4, t_5]$. These time intervals have the same time duration, indicated as $T_1 + T_0$ in FIG. 5b.

The clock period and the portion of time for which all the transistors are OFF may be adjusted by varying delays $T_1$ and $T_2$. For there to be a portion of time for which all transistors are OFF, $T_2 > T_1 + T_0$. FIG. 5b is somewhat idealized because it shows clock signals $\phi_1$ and $\phi_2$ transitioning at the same time instances, and likewise for clock signals $\phi_3$ and $\phi_4$. In practice, this need not be the case. Furthermore, in practice, the delays for NAND gates 502 may not be perfectly matched. Likewise for the other delays. However, the delays should be such that the clock signals allow capacitor 414 to be isolated from the input and output ports for some time interval before being coupled to the input ports or the output ports.

As seen in FIG. 5a, clock signals $\phi_1$ and $\phi_2$ are inverses of each other. Likewise for clock signals $\phi_3$ and $\phi_4$. However, if all the transistors in the switched capacitor transformer where to have the same type of majority carriers (e.g., both are nMOSFETs), then clock signals $\phi_2$ and $\phi_4$ may be taken, respectively, as $\phi_1$ and $\phi_3$, so that only two clock signals need to be generated. Clearly, various embodiments may be realized depending upon the type of transistors used in the switched capacitor transformer. However, for coupling an input voltage close to $V_{CC}$, it is preferable to use a pMOSFET because a nMOSFET does not efficiently couple voltages close to or larger than $V_{CC} - V_T$, where $V_{CC}$ is the supply voltage as well as the applied gate voltage to switch the nMOSFET ON, and $V_{TN}$ is the threshold voltage of the nMOSFET. Likewise, a nMOSFET is preferred for coupling an input voltage close to ground ($V_{SS}$) because a pMOSFET does not efficiently couple voltages close to or lower than $V_{SS} - V_{TP}$, where $V_{TP}$ is the threshold voltage of the pMOSFET (which is negative for enhancement mode devices). This is the reason why in the embodiment of FIG. 4, it is preferable that transistors 406 and 410 are pMOSFETs and that transistors 408 and 412 are nMOSFETs.

In practice, the voltage difference between output ports 420 and 422 is not identical to the voltage difference between input ports 416 and 418. For example, if output ports 420 and 422 are loaded so that a DC current is drawn, then some of the stored charge on capacitor 414 will be drawn by the load and the output differential voltage will not be an identical to the input differential voltage. At low clock frequency, capacitor 404 may help filter out variations in the output differential voltage. Capacitor 402 may be used to reduce noise that may be injected back to the reference distribution network (FUB1 302). When a relatively large DC voltage offset is expected between output port 422 and input port 418, and output port 422 is connected to local ground, then care should be taken to minimize the parasitic capacitance between node 424 and substrate or other signal lines. The parasitic capacitance of node 426 is not as critical. Minimizing parasitic capacitance may be accomplished by using small-sized transistors and by careful layout of capacitor 414.

Figure 6:
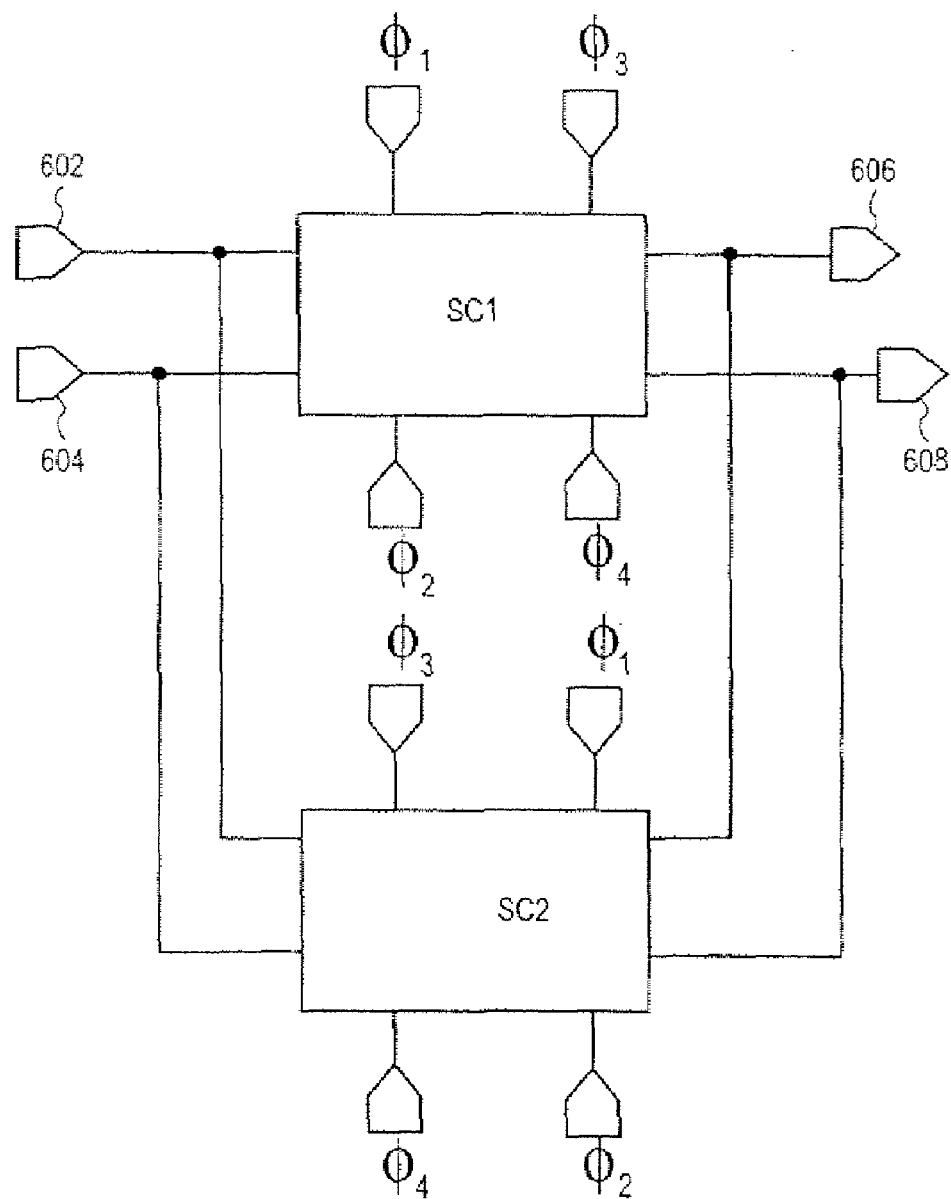
FIG. 6 depicts how two switched capacitor transformers of the type shown in FIG. 4 may be utilized to reduce voltage ripple.

Further reduction in the variation in the output differential voltage due to switching capacitor 414 among the input and output ports may be realized by utilizing two switching capacitor transformers in parallel so that when the switched capacitor of one transformer is coupled to the input ports the switched capacitor of the other transformer is coupled to the output ports. For example, consider the two switched capacitor transformers in FIG. 6. Both SC1 and SC2 have the same structure, but the connections to the clock signals are as indicated in FIG. 6. When the switched capacitor of SC1 is coupled to input ports 602 and 604, the switched capacitor of SC2 is coupled to output ports 606 and 608. Similarly, when the switched capacitor of SC1 is coupled to output ports 606 and 608, the switched capacitor of SC2 is coupled to input ports 602 and 604.

Figure 7:
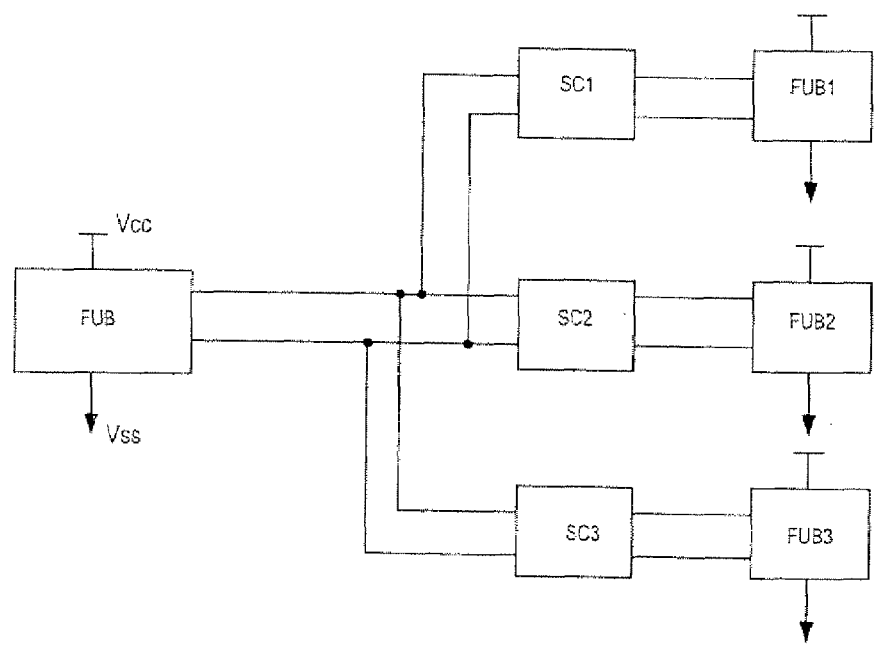
FIG. 7 depicts another embodiment of the present invention utilizing more than one switched capacitor transformer for providing reference voltage to more than one functional unit block.

If a reference voltage is to be distributed to more than one FUB, then more than one switched capacitor transformer may be used. FIG. 7 provides one such example, where a single differential reference signal is provided to FUB1, FUB2, and FUB3. Each of FUB1, FUB2, and FUB3 may use different power supplies, or some or all may be powered from the same power supply. Also, some of the receiving FUBs may reference their respective received differential signals with respect to local $V_{CC}$, and some or all of the receiving FUBs may reference the received differential signals with respect to local ground.

Various modifications may be made to the disclosed embodiments without departing from the scope of the invention as claimed below. For example, it is to be appreciated that the transistors in the embodiment of FIG. 4 act as switches. Other embodiments may be realized by utilizing different switching elements. For example, a so-called complementary switch may be used, comprising a pMOSFET and a nMOSFET in parallel, where the clock signal applied to one of the gates of the complementary switch is the inverse of the clock signal applied to the other gate of the complementary switch. With this in mind, the term "switch" is used in the claims, which may include one or more transistors to operate as a switch. Furthermore, it is to be understood in these letters patent that the phrase "A is connected to B" means that A and B are directly connected to each other, for example, by way of an interconnect, such as metal or polysilicon. This is to be distinguished from the phrase "A is coupled to B", which means that the connection between A and B may not be direct. That is, there may be an active passive element between A and B, or there may be an active device that couples A to B when ON.

What is claimed is:

1. An apparatus for distributing reference voltages, comprising a voltage reference circuit to develop the reference voltage, a functional unit to operate based upon the reference voltage, and a first switched capacitor transformer comprising a first capacitor and a first plurality of switches that couple the first capacitor to the voltage reference circuit in order to receive the reference voltage during a first period and that couple the first capacitor to the functional unit in order to deliver the reference voltage to the functional unit during a second period, and a second switched capacitor transformer comprising a second capacitor and a second plurality of switches that couple the second capacitor to the voltage reference circuit in order to receive the reference voltage during the second period and that couple the second capacitor to the functional unit in order to deliver the reference voltage to the functional unit during the first period.

2. The apparatus as set forth in claim 1, further comprising:

a clock generator to switch first and second switches of the first switched capacitor transformer and third and fourth switches of the second switched capacitor transformer ON during the first period and to switch third and fourth switches of the first switched capacitor transformer and first and second switches of the second switched capacitor transformer ON during the second period, wherein the first and second periods are disjoint.

3. The apparatus as set forth in claim 2, wherein the first and third switches are pMOSFETs, and the second and fourth switches are nMOSFETs.

4. The apparatus as set forth in claim 1, wherein the first switched capacitor transformer further comprises first and second input ports coupled to the voltage reference circuit;

first and second output ports coupled to the functional unit;

a second capacitor comprising a first terminal connected to the first input port and a second terminal connected to the second input port; and a third capacitor comprising a first terminal connected to the first output port and a second terminal connected to the second output port.

5. The apparatus of claim 1 further comprising a clock generator to control switching of the first plurality of switches and the second plurality of switches such that the first capacitor is not simultaneously coupled to both the voltage reference circuit and the functional unit and such that the second capacitor is not simultaneously coupled to both the voltage reference circuit and the functional unit.

6. The apparatus as set forth in claim 1, further comprising a clock generator to switch first and second switches of the first switched capacitor circuit ON and third and fourth switches of the first switched capacitor circuit OFF to couple the first capacitor to the voltage reference circuit and to decouple the first capacitor from the functional unit during the first period, and switch first and second switches of the second switched capacitor circuit OFF and third and fourth switches of the second switched capacitor circuit ON to decouple the second capacitor from the voltage reference circuit and to couple the second capacitor to the functional unit during the first period.

7. The apparatus as set forth in claim 1, further comprising a clock generator to switch first and second switches of the first switched capacitor circuit OFF and third and fourth switches of the first switched capacitor circuit ON to decouple the first capacitor from the voltage reference circuit and to couple the first capacitor to the functional unit during the second period, and switch first and second switches of the second switched capacitor circuit ON and third and fourth switches of the second switched capacitor circuit OFF to couple the second capacitor to the voltage reference circuit and to decouple the second capacitor from the functional unit during the second period.

8. An integrated circuit comprising a voltage reference circuit to provide a reference voltage, a plurality of functional units that operate based upon the reference voltage, and a plurality of switched capacitors, each switched capacitor to receive the reference voltage from the voltage reference circuit during a first time duration of a clock and to deliver the reference voltage to at least one functional unit of the plurality of functional units during a second time duration of the clock.

9. The integrated circuit of claim 8 wherein a functional unit of the plurality of functional units comprises an amplifier and the reference voltage biases the amplifier.

10. The integrated circuit of claim 8 wherein a functional unit of the plurality of functional units comprises a phase lock loop having a frequency defined by the reference voltage.

11. The integrated circuit of claim 8 wherein a functional unit of the plurality of functional units comprises a voltage regulator having an output voltage defined by the reference voltage.

12. The integrated circuit of claim 8 wherein each of the plurality of switched capacitors comprises a capacitor and a plurality of switches to couple the capacitor to the reference voltage during the first time duration and to decouple the capacitor from the plurality of functional units during the first time duration.

13. The integrated circuit of claim 12 wherein each of the plurality of switched capacitors comprises a capacitor and a plurality of switches to decouple the capacitor from the reference voltage during the second time duration and to couple the capacitor to at least one functional unit of the plurality of functional units during the second time duration.

14. The integrated circuit of claim 13 wherein the first time duration and the second time duration are non-overlapping.

15. A method comprising generating a reference voltage, coupling the reference voltage to a first capacitor and decoupling a functional unit from the first capacitor to develop the reference voltage across the first capacitor during a first period of a clock, and decoupling the reference voltage from a second capacitor and coupling a functional unit to the second capacitor to provide the functional unit with the reference voltage during the first period of the clock.

16. The method of claim 15 further comprising decoupling the reference voltage from the first capacitor and coupling the functional unit to the first capacitor to provide the functional unit with the reference voltage during a second period of the clock, and coupling the reference voltage to the second capacitor and decoupling the functional unit from the second capacitor to develop the reference voltage across the second capacitor during the second period of the clock.

17. The method of claim 15, further comprising setting a frequency of the functional unit based upon the reference voltage.

18. The method of claim 15, further comprising setting an output voltage of the functional unit based upon the reference voltage.

19. The method of claim 15, further comprising biasing the functional unit based upon the reference voltage.

20. The method of claim 15, wherein the first period and second period are non-overlapping.

* * * * *